Figure 1:
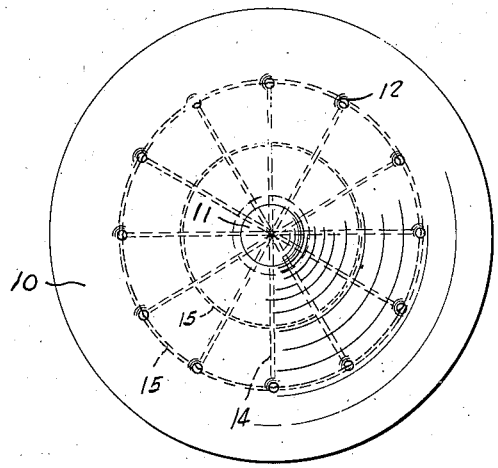

Jan. 22, 1946.   D. J. RIDDELL   2,393,266
CONTACT LENS
Filed Dec. 7, 1943

INVENTOR.
DONALD J. RIDDELL
BY

Patented Jan. 22, 1946

2,393,266

UNITED STATES PATENT OFFICE 2,393,266

CONTACT LENS

Donald J. Riddell, Ardmore, Pa.

Application December 7, 1943, Serial No. 513,215

2 Claims. (Cl. 88—54.5)

This invention relates to lenses used for eye protective and corrective purposes and is concerned primarily with the lenses of the so-called "contact" type which are worn as direct coverings of the eyeballs.

Under many conditions, it is impractical to aid a person's vision by using the conventional eyeglasses of the spectacle type, and, in view of this fact, contact lenses have been designed which are fitted directly over the eyeball and which move therewith during movement of the eyes. It may be stated as a general rule that heretofore these contact lenses have consisted of a refractory or corrective portion which covers the cornea of the eye and an outer scleral rim which covers the sclera, and, in extending beneath the eyelid, aids in positioning the lens.

Where vacuum conditions have been employed as the means for retaining the lens in position, some little difficulty has been experienced in removing the lens. Furthermore, considerable difficulty has been experienced in accurately fitting each lens to the eyeball of each particular patient. As a matter of fact, it has been necessary to make each set of lenses "to order" to fit the eyeballs of each wearer. Moreover, a serious defect of the now available contact lenses which are "ready made" and carried in stock is that they maye be worn for only a short period of time. This may be attributed directly to the fact that when the lens covers the eyeball the ordinary lubricating functions of the eye fluid are seriously disturbed, if not positively inhibited. Thus, after the lenses are worn for a comparatively brief interval, marked irritation is felt, and it becomes necessary to remove the lenses from time to time to permit this normal function of the eyes.

With the foregoing undesirable conditions in mind, this invention has in view, as its foremost objective, the provision of a contact lens of the type above noted which is particularly characterized as comprising a flexible support which carries a refractory or corrective lens that is intended to be positioned directly over the cornea of the eye.

More in detail, the invention has as an object the provision of a contact lens of this character in which the flexible support is made from an appropriate plastic that is chemically inert, so far as the eyes are concerned, and which will not react with the eye fluid in any way to cause irritation or discomfort. Such plastics are available, and the property of flexibility may be further enhanced by structural characteristics imparted to the support. Thus, that portion of the support which is removed from the cornea may be provided with a number of small openings. The concave or underface of the support may also be scored with circular and radial ducts which serve not only to make the support more flexible, but which also decrease the area of engagement between the support and the eyeball and constitute lubricating ducts providing for the circulation of the fluid.

With a contact lens made in accordance with the above noted precepts, the small openings will be made in that portion of the support which covers the sclera. Thus, they will be positioned beneath the eyelid. Vacuum conditions will ordinarily hold the lens in position, but, when the eyelid is raised, the openings become uncovered, and it is a comparatively easy matter to remove the lens.

Various other more detailed objects and advantages of the invention, such as arise in connection with carrying out the above noted thoughts in a practical embodiment, will in part become apparent and in part be hereinafter stated as the description of the invention proceeds.

The invention, therefore, comprises a contact lens consisting of a concave or cup-shaped flexible support adapted to be fitted over an eyeball. This support is essentially flexible and is preferably made from an appropriate plastic and is provided with a series of small openings, together with circular and radial ducts on its inner face which serve to increase its flexibility and provide lubricating channels. Carried by the support is a small refractory or corrective lens that is adapted to be positioned directly over the cornea of the eye to which the lens is fitted.

Figure 2:
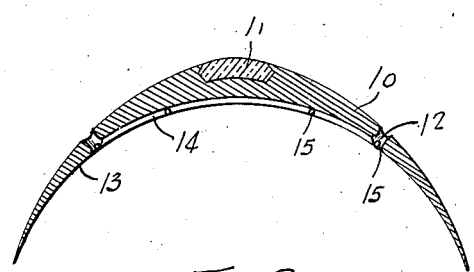

For a full and more complete understanding of the invention, reference may be had to the following description and accompanying drawing, wherein:

Figure 1 is a top plan view of a contact lens made in accordance with the precepts of this invention; and Figure 2 is a transverse section through the lens shown in Figure 1.

Referring now to the drawing, wherein like reference characters denote corresponding parts, it will be noted that the contact lens of this invention comprises essentially a support 10 in which is embedded a refractory or corrective lens 11.

The support 10 is preferably made from an appropriate plastic having the required properties of transparency, flexibility and chemical inertness. Such plastics are available to the public and are readily adapted to being colored so that the contact lens may be imparted a color corresponding to the color of the eyes of the person for whom they are prescribed. The support 10 is concave or cup-shaped and is intended to extend over the cornea and sclera of the eyeball. It is thickest at the center and gradually diminishes in thickness to the outer edge, as is depicted in Figure 2. By properly controlling the thickness of the support 10, the property of flexibility may be governed with a high degree of nicety.

It will be noted that the support 10 is formed with a plurality of small openings 12 which are removed from that portion of the support which covers the cornea. These openings 12 are arranged in a ring or circle, as shown in Figure 1, and ordinarily will be positioned over the sclera. The inner or concave face of the support 10, which is identified at 13, is formed with a plurality of radial ducts 14 which extend radially inwardly from the openings 12. Circular ducts 15 may also be included, and, in the illustrated embodiment, are shown as connecting the openings 12.

It is evident that the presence of the openings 12 and ducts 14 and 15 increase the flexibility of the support, but these structural characteristics also provide additional functions and advantages. In the first place, they constitute lubricating ducts or channels which aid in the circulation of the eye fluid. This circulation is an important function of the eye and serves to decrease irritation. The presence of these ducts and openings also decreases the area of contact between the support and the eyeball with a corresponding decrease in irritating effects.

It is evident that with the lens fitted over the eyeball the openings 12 will be covered by the eyelid. Thus, the vacuum condition obtaining beneath the support 10 will maintain the lens in position, and cause it to move with the eyeball. However, when it is desired to remove the lens, the vacuum condition may be destroyed by merely raising the eyelid and uncovering the openings 12.

A particularly important advantage of the improved contact lens in this invention is the ease with which the lenses may be fitted to various patients. With a lens of the non-flexible type heretofore available, considerable difficulty has been experienced in accurately fitting the lenses to the eyeballs. However, when the support is of the flexible nature hereby provided, it is evident that this fitting may be easily carried out. Perhaps the greatest advantage, however, lies in the fact that the lens may be worn for long periods of time without removal due to the provision made for circulation of the eye fluid.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claims.

What is claimed is:

1. In a contact lens of the character described, a cup-shaped, transparent, flexible support adapted to be fitted over an eyeball, said support being formed with a series of small openings and lubricating ducts on the inner face of said support extending radially inwardly from said openings, and a refractory lens carried by said support substantially centrally thereof.

2. A contact lens of the character described comprising a transparent, flexible cup-shaped support having its greatest thickness at its center and gradually diminishing in thickness towards its edge, said support being formed with a series of small openings, lubricating ducts on the inner face of said support joining said openings and other lubricating ducts extending inwardly radially from said openings, and a refractory lens carried by said support substantially at its thickest portion.

DONALD J. RIDDELL.